F. HASBROOK.
Wheel-Plows.

No. 138,329. Patented April 29, 1873.

Witnesses.
B. F. Wells.
E. D. Hasbrook.

Inventor.
Fred Hasbrook

UNITED STATES PATENT OFFICE.

FRED HASBROOK, OF STOKES' MOUND, MISSOURI.

IMPROVEMENT IN WHEEL-PLOWS.

Specification forming part of Letters Patent No. 138,329, dated April 29, 1873; application filed August 13, 1872.

*To all whom it may concern:*

Be it known that I, FRED HASBROOK, of Stokes' Mound, Carroll county, Missouri, have invented certain Improvements in Sulky-Plows, of which the following is a specification:

My invention relates to the manner of attaching a plow to a sulky or other wheeled vehicle, and to the manner of raising and lowering the plow, the object of the invention being to give the plow in raising and lowering a perpendicular motion, and not a tilting motion, as by raising either end of the plow; and also to hold the plow steady during operation; and to regulate its depth of penetration, all as hereinafter more fully set forth.

Figure 1:
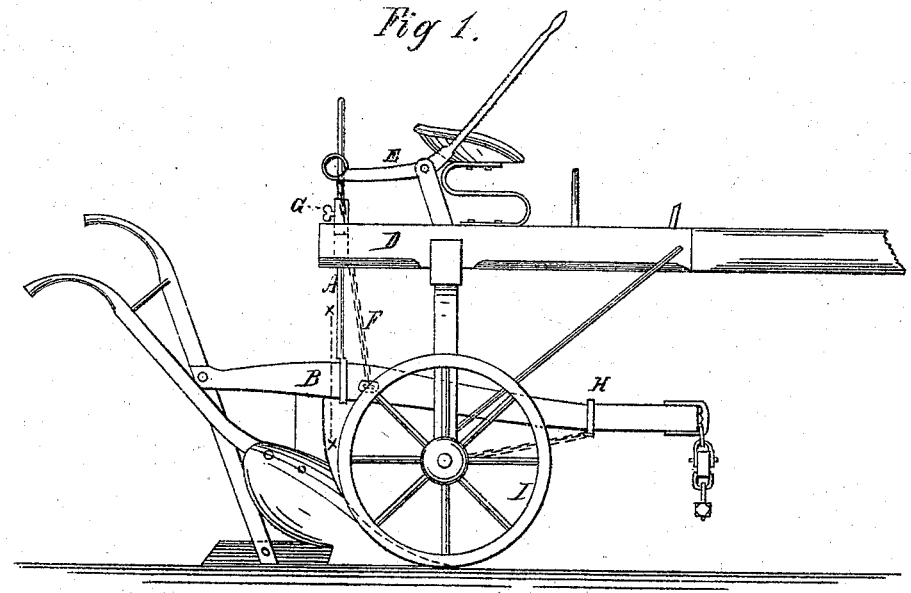
Figure 2:
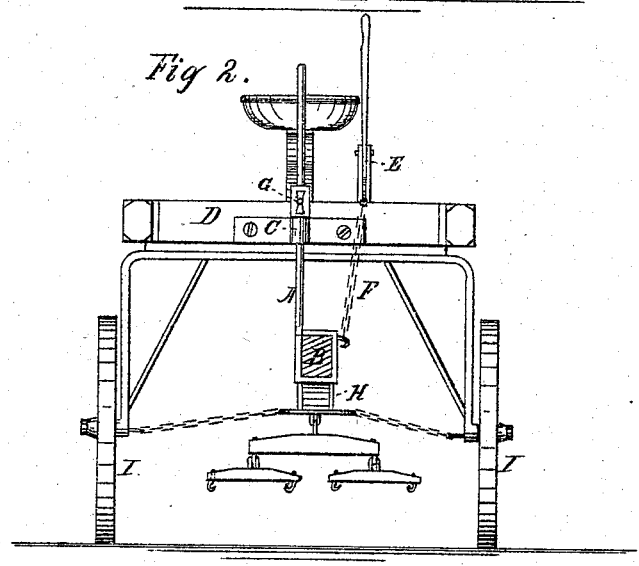

In the accompanying drawing, Figure 1 is a side elevation of my improved sulky-plow. Fig. 2 is a vertical section of the same on line *x x*, Fig. 1.

D represents an ordinary truck-frame mounted on two wheels, I I, and provided with a seat for the driver. It may be constructed in any convenient form, and of any material suitable for the purpose. B represents the beam of a plow, of ordinary construction, my device being applicable to any description of plow in common use. A is a vertical rod or bar of metal, the lower end of which is fitted around and secured to the plow-beam at or near the point where the weight of the plow is balanced. The upper end of the bar A passes through a box, C, secured in the rear end of the truck-frame, the bar and box being truly fitted so that the bar may slide up and down through the box without difficulty. G is a movable block fitted on the bar A above the box C. It is provided with a set-screw, by means of which it may be firmly secured to the bar at any desired point. E is a hand-lever pivoted to a standard secured to the truck-frame. To the short or rear end of this lever is attached a chain, F, which passes down and is secured to the plow-beam B. H H are brace-rods or chains which connect the forward end of the plow-beam with the axles of the wheels I.

The operation of my invention is as follows: The bar A being rigidly secured to the plow-beam, in the manner described, and its end passed up through the box C, the plow may be lifted clear above the ground by the lever E and chain F, and suspended to the truck-frame. In this way it can be easily transferred from place to place.

When the plow is to be used the depth of furrow which it is desired to turn is regulated by the adjustable block and set-screw G, which is secured to the bar A at the proper point. The plow is then lowered to the ground until the block G comes in contact with the box C, and thereby prevents its further descent. In this way the plow is suspended at the proper height, and is prevented from running deeper than desired.

The bar A holds the plow steady during operation, and prevents any tendency to tilt forward or backward, yet permits of its rising or being raised to clear obstacles, or for convenience in turning at the end of the row.

The draft may be applied to the clevis on the end of the plow-beam, as in ordinary plows, the truck being drawn forward at the same time by means of the connecting braces or chains H H.

It is, therefore, obvious that my invention may be readily applied to any plow of ordinary construction, and that any truck or frame on wheels may be adapted for use without requiring to be built for the special purpose.

What I claim as my invention is—

The combination of the bar or rod A, box C, block G, chain F, and lever E, substantially as and for the purpose specified.

FRED HASBROOK.

Witnesses:
B. F. WELLS,
E. D. HASBROOK.